United States Patent [19]

Forseth

[11] 4,230,670
[45] Oct. 28, 1980

[54] CARBON BLACK PRODUCING APPARATUS AND METHOD

[75] Inventor: Glenn J. Forseth, Toledo, Ohio

[73] Assignee: Phillips Petroleum Company, Bartlesville, Okla.

[21] Appl. No.: 871,676

[22] Filed: Jan. 23, 1978

[51] Int. Cl.² ............... C01B 49/00; C01B 31/02
[52] U.S. Cl. .................... 422/151; 422/207; 423/450
[58] Field of Search ............... 261/115, 117, 118, D9; 422/150, 151, 207; 423/450; 239/433, 434, 426, 428, 431, 548, 559, 567

[56] References Cited

U.S. PATENT DOCUMENTS

| | | | |
|---|---|---|---|
| 843,180 | 2/1907 | Rogers | 261/115 |
| 1,016,491 | 2/1912 | Guild | 261/118 |
| 2,915,372 | 12/1959 | Warner | 422/151 |
| 3,307,911 | 3/1967 | Krejci | 423/456 |
| 3,401,020 | 9/1968 | Kester | 423/450 |
| 3,615,211 | 10/1971 | Lewis | 423/450 |
| 3,663,172 | 5/1972 | Foster-Pegg | 423/450 |
| 3,817,713 | 6/1974 | Ionescu | 261/115 |
| 3,965,690 | 6/1976 | Berryhill | 261/115 |
| 4,061,478 | 12/1977 | Hartwick | 261/118 |
| 4,138,217 | 2/1979 | Slagel et al. | 422/150 |

Primary Examiner—R. E. Serwin
Assistant Examiner—Chris Konkol

[57] ABSTRACT

A carbon black reactor includes a housing which has a refractory lining defining an elongate chamber. The chamber is comprised of a plurality of compartments which include a combustion compartment, a reaction compartment and a quench compartment. An inlet means opens into the combustion compartment and is operable for introducing hot combustion gases into the combustion compartment. Another inlet means opens into the chamber and is operable for introducing a feedstock hydrocarbon into the chamber. Quench liquid inlet means opens into the quench compartment and is operable for introducing quench liquid into the quench compartment. The quench inlet means includes a plurality of tubular members extending into the quench compartment, each having spaced apart discharge openings along the length thereof. The discharge openings of one tubular member are offset along the length of the one tubular member relative to the discharge openings on another of the tubular members whereby quench liquid sprays discharged from the discharge openings of one tubular member substantially cover openings between the sprays discharged from another of the tubular members.

18 Claims, 5 Drawing Figures

CARBON BLACK PRODUCING APPARATUS AND METHOD

The present invention relates to a carbon black producing method and apparatus. In one aspect the invention relates to the provision of a plurality of tubular spray headers in the quench compartment of a carbon black reactor with the discharge openings of one tubular spray header being offset relative to the discharge openings in another tubular spray header such that the spray patterns overlap to provide a wall or curtain of quench liquid across the quench compartment through which substantially all of the reactor combustion products must pass for contact with the quench liquid.

Quenching a carbon black reaction is done for two principal reasons: control of reaction time, and temperature reduction to protect downstream equipment such as a filtering apparatus. One of the more common means of effecting quenching is the use of water injected into a quench compartment in the carbon black reactor.

For some carbon black products, quenching is done at one site by one or more nozzles. Thus, both principal reasons for quenching are satisfied at one locus within the quench compartment. However, in the production of tread black, quenching is usually done at two locations in the quench compartment, the first being used for reaction quenching and the second quench being used to control the temperature of the effluent discharged from the reactor to other processing equipment. In the latter manner of quenching, there are in actuality three temperature zones within the reactor. The first temperature zone is the reaction zone wherein the average temperature is usually in the range of about 2600° F. to about 3000° F. In the second zone the quench fluid lowers the temperature of the combustion products sufficiently to stop the pyrolysis action, generally to a temperature less than 2600° F. and greater than 1500° F. In the third zone quench fluid cools the combustion products to a temperature in the range of about 1100° F. to about 1700° F. and the temperature desired will depend upon the temperature capabilities of secondary processing equipment. Further cooling such as by indirect heat exchange, is normally used to bring the reactor effluent temperature into the range of about 400° F. to about 600° F. prior to separating the carbon black from the gaseous portion of the reactor effluent.

To control specified carbon black properties such as the effect of carbon black on the modulus of rubber compounded therewith, photelometer and iodine number, the prequench location and/or quench liquid input rate can be varied. The photelometer value is the measure of light transmitted through a solvent after mixing the solvent with a carbon black sample and then filtering out the carbon black; thus, photelometer value is a measure of extractables. The test is performed according to ASTM D 1618-75. The iodine adsorption test (ASTM D 1510-76) is a test used to indicate the surface area of the carbon black. Modulus is determined in accordance with ASTM D 412-75.

It is possible to obtain the same iodine and photelometer values at different prequench locations by using different prequench quench liquid input rates provided the combustion air, fuel, and feedstock hydrocarbon flow rates are not changed. Accordingly, it is possible to expose the reactants to slightly different residence times within the reactor at two higher temperature zones and still produce substantially the same product.

It is believed that the most efficacious properties of carbon black are best retained by quenching the combustion products in the first quench zone with as short a residence time as possible using a low quench liquid input rate. It is also desirable to form additional temperature zones by having a number of quench sites at regular intervals using low quench fluid input rates thereby providing a more uniform temperature gradient along the length of the quench compartment.

Another problem in the quenching of the combustion products is assuring uniform contact of the combustion products with the quench fluid. Currently, in some prequench systems, a tubular member extends into the quench compartment and discharges quench liquid from a plurality of discharge openings into the combustion products to form quenched effluent. However, there are open spaces between the individual sprays. A portion of the combustion products can pass through these open spaces in the curtain of quench liquid without contacting the quench liquid, thereby preventing proper quenching of this portion of the effluent. The present invention provides a carbon black producing apparatus and method which overcomes this difficulty.

It is an object of this invention to provide a carbon black reactor with quench liquid inlet means and carbon black producing means which overcome the above-mentioned problems. It is another object of this invention to provide a quench liquid inlet means which, for use, requires minimal structural changes to existing carbon black reactors. It is a further object of this invention to provide a carbon black producing apparatus with quench liquid inlet means which are well adapted for their intended use, easy to maintain and inexpensive to manufacture. It is another object of this invention to provide a carbon black producing process which is well adapted for quench of a carbon black producing reactor.

Other objects and advantages of the present invention will become apparent from the following detailed description taken in connection with the accompanying drawings wherein are set forth by way of illustration and example certain embodiments of this invention.

Figure 1:
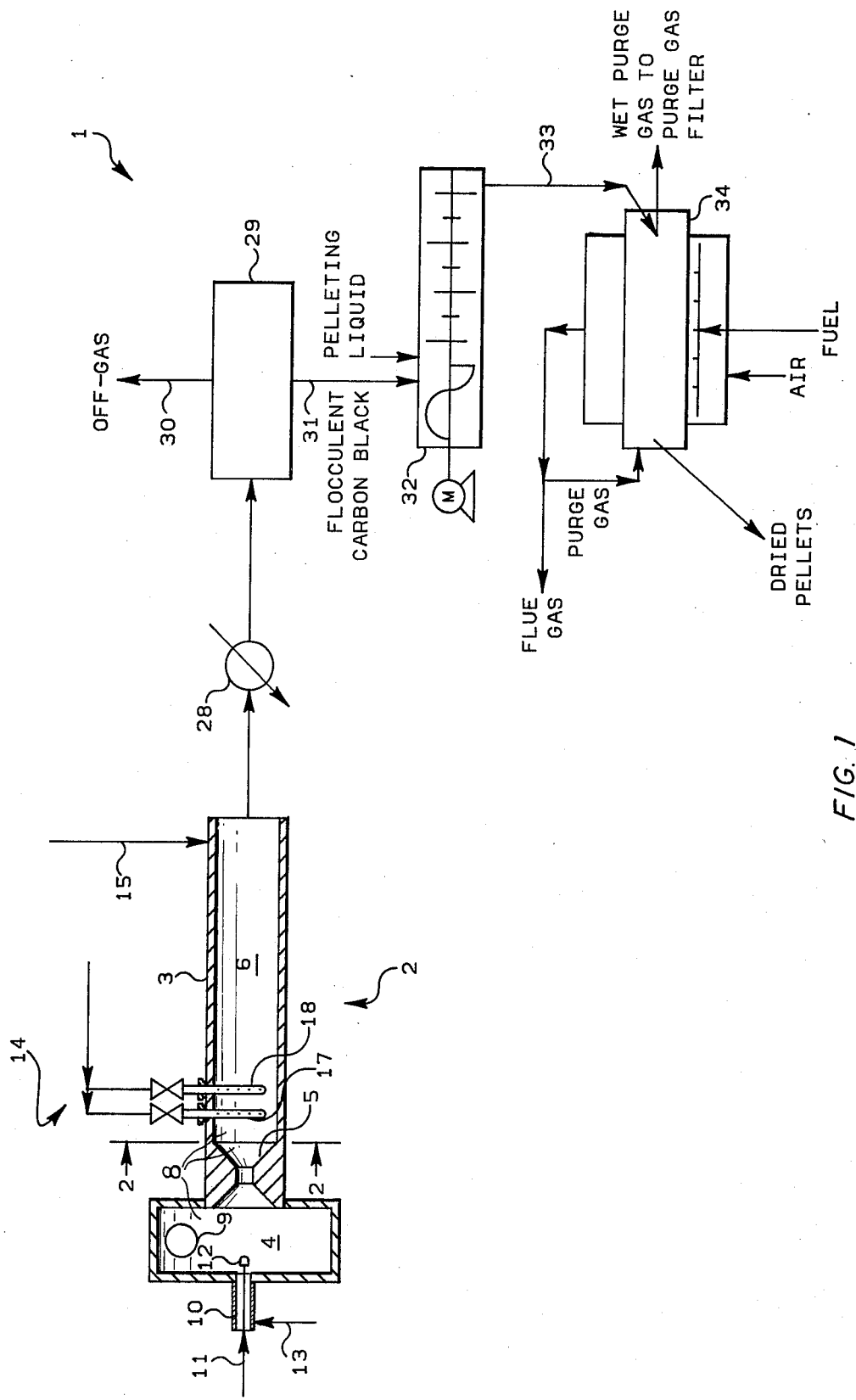
FIG. 1 is a schematic illustration of a carbon black producing apparatus.

The reference numeral 1 designates generally an apparatus for producing carbon black. The apparatus 1 includes a reactor 2 of any suitable type, for example, that disclosed in U.S. Pat. No. 2,564,700, which disclosure is incorporated herein by reference. The reactor 2 includes a housing 3 which preferably is refractory lined, with the lining defining a chamber 8. The chamber 8 includes a combustion compartment or zone 4, a reaction compartment or zone 5 downstream of the combustion compartment 4, and a quench compartment or zone 6 which is downstream of the reaction compartment 5. If desired, a venturi 7 can be provided in the reaction compartment 5. Combustion gas inlet means 9 opens into the combustion compartment 4 and is operable for introducing either a burning admixture of combustible fuel and an oxygen-containing gas such as air or an admixture of the fuel and air for burning in the combustion compartment 4. Preferably, the inlet means 9 is of a type which introduces the combustion gases in a generally tangential manner, relative to the cylindrical wall of the combustion compartment, for vortex flow of the combustion gases longitudinally along the reaction chamber 5 and quench chamber 6. Inlet means 10 opens into the chamber 8 and is operable for introducing a feedstock hydrocarbon into the chamber 8 for contact with the hot combustion gases for pyrolysis thereby to produce combustion products including particulate carbon black. The inlet means 10 includes a conduit 11 having a nozzle 12 on the end thereof positioned in the chamber 8. The inlet means 10 can also include a conduit 13 operable for introducing generally axially directed air or the like, e.g, nozzle cooling air, into the chamber 8 and preferably the conduit 13 is coaxial with and surrounds the conduit 11.

The reactor 2 is provided with quench inlet means 14 which is operable for introducing a quench liquid into the quench chamber 6 to function preferably as the first quench. Second quench inlet means 15 open into the quench compartment 6 downstream of the quench inlet means 14 and is operable for introducing a quench fluid into the quench compartment 6 for further quenching and cooling the effluent. The quench inlet 15 can be connected to any suitable source of quench fluid such as water or cooled smoke or cooled effluent portion from the reactor 2.

Figure 3:
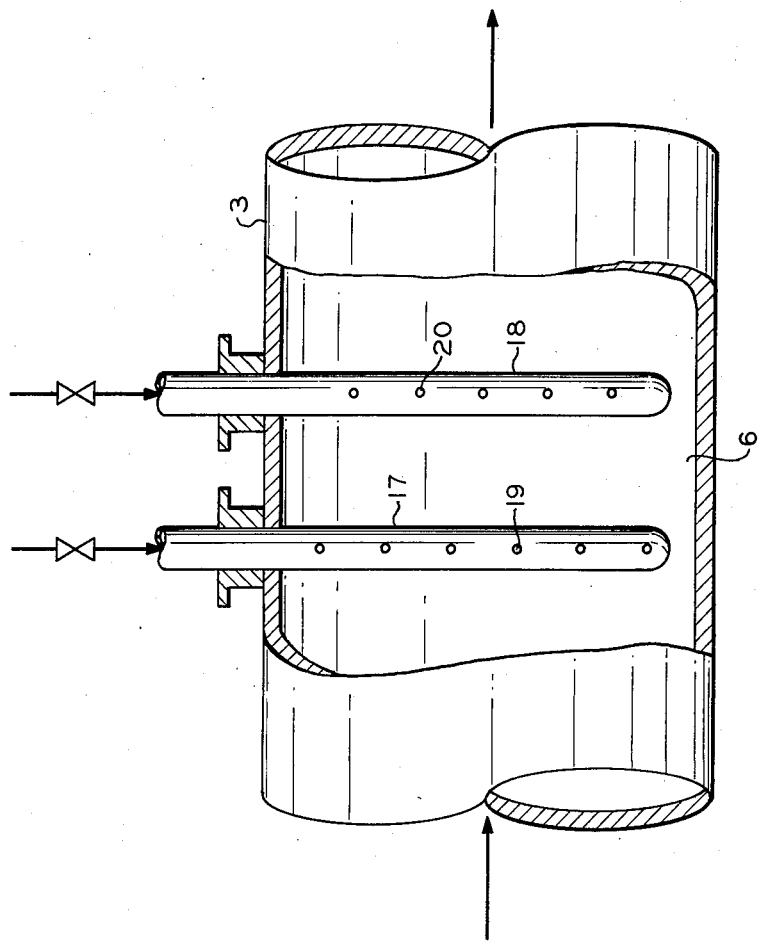
FIG. 3 is a side-elevational fragmentary view of the form of the invention shown in FIG. 2.
Figure 2:
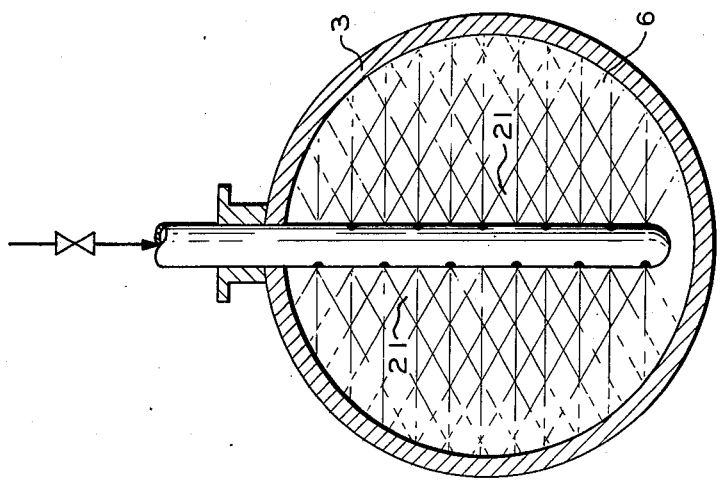
FIG. 2 is a fragmentary view in cross section of a portion of the reactor taken along the line 2—2, FIG. 1, showing one form of the present invention.

The quench inlet means 14 in one embodiment of the invention is best seen in FIGS. 2 and 3. In this embodiment, the quench inlet means 14 includes a plurality of tubular members, here shown as two members designated 17 and 18. Any number, greater than one, of tubular members can be used and can be arranged in any suitable manner to accomplish the result described herein below. Preferably, the tubular members 17 and 18 each extend at least substantially across the width of the quench zone and are in generally parallel relationship to one another. Preferably, the tubular members 17 and 18 extend generally transversely through the longitudinal axis of the quench chamber. Each of the tubular members 17 and 18 has a plurality or series of discharge openings, 19 and 20 respectively, along the length thereof preferably in linear arrays and at least substantially on opposite (left and right) sides of the respective tubular member to form a pair of spray patterns of liquid, with each spray pattern extending generally transversely across a respective half of the width of the quench compartment 6. The pair of spray patterns from a tubular member preferably lie at least substantially in a common plane generally perpendicular to the quench compartment 6 longitudinal axis. However all, or selected ones, of the discharge openings 19 or 20 can be pointed upstream or downstream or in any combination of upstream and downstream angles of up to about 30° with respect to a plane which is perpendicular to the quench compartment 6 longitudinal axis. Because the discharge openings 19 are in spaced apart relation to one another along the length of the tubular member 17 and the discharge openings 20 are in spaced apart relation to one another along the length of the tubular member 18, openings 21 result in each of the spray patterns and a portion of the combustion products can pass through these openings in each spray pattern without being quenched by the respective spray pattern. In the embodiment of the invention shown in FIGS. 2 and 3, the tubular member 18 is spaced from the tubular member 17 along the longitudinal axis of the quench compartment 6, and the portion of the discharge openings 20 in the tubular member 18 is offset along the length of the tubular member 18 relative to the portion of the discharge openings 19 in the tubular member 17. Preferably, when two tubular members are used, the offset is approximately ½ of the spacing between the discharge openings on the other tubular member forming the opening covered by the spray from the offset opening. However, other offsets can be provided when other numbers of tubular members are used. By offsetting the discharge openings in the tubular member 17 with respect to the discharge openings of the tubular member 18, the openings 21 of the spray pattern for the tubular member 17 are overlapped or covered by the sprays from the tubular member 18 when viewed from either end of the quench compartment 6. The tubular members 17 and 18 are sufficiently close together with respect to their spacing along the logitudinal axis of the quench compartment 6 to prevent combustion products passing through the openings 21 in the spray pattern from the tubular member 17 from also passing through the openings 21 in the spray pattern from the tubular member 18 due to the vortex flow of the combustion products. Accordingly, there is improvement of the quench efficiency.

Figure 4:
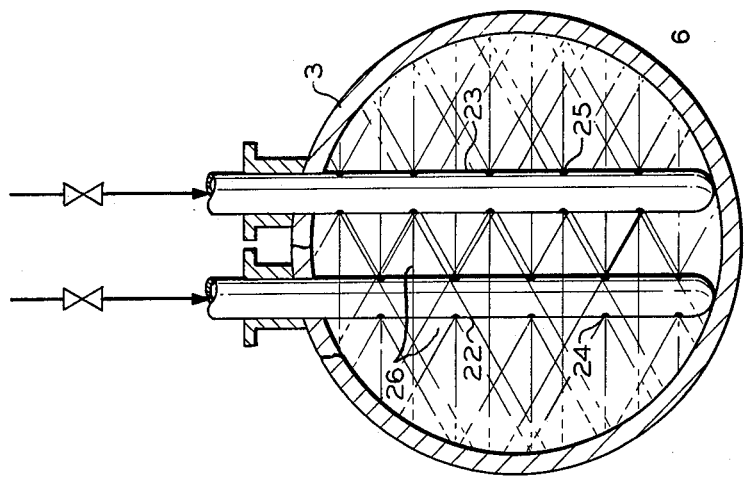
FIG. 4 is a fragmentary view in cross section taken along a cut line corresponding in position to line 2—2 showing a modified form of the present invention.

FIG. 4 shows another embodiment of the present invention wherein a plurality, preferably two in number, of tubular members 22 and 23 extend into the quench compartment 6 and are in spaced apart relationship to one another and are on opposite sides of the longitudinal axis of the quench compartment 6. Preferably, the tubular members 22 and 23 each extend at least substantially across the quench compartment 6, however, other arrangements of two or more tubular members can be provided. The tubular members 22 and 23 are preferably in generally parallel relationship to one another and have discharge openings 24 and 25 respectively. A plurality of discharge openings in each tubular member open generally in one direction while another plurality of discharge openings open in a generally opposed direction from the respective tubular member. The discharge openings 24 opening toward the tubular member 22 are offset relative to the discharge openings 25 opening toward the tubular member 22 to provide overlapping spray patterns to cover the openings 26 formed between adjacent sprays from a respective tubular member. The discharge openings facing one direction in one of the tubular members can be generally across the respective tubular member from one another or can also be offset axially along the length of the respective tubular member to provide another spray pattern still substantially eliminating open areas in the combined spray pattern. The opening 24 and 25 may be uniformly spaced apart, randomly spaced apart or in any suitable pattern of spacing. As seen in FIG. 4, the tubular members 22 and 23 are in substantially the same plane which extends generally transversely across the width of the quench chamber 6 with the plane being generally normal to the longitudinal axis of the quench chamber 6.

Figure 5:
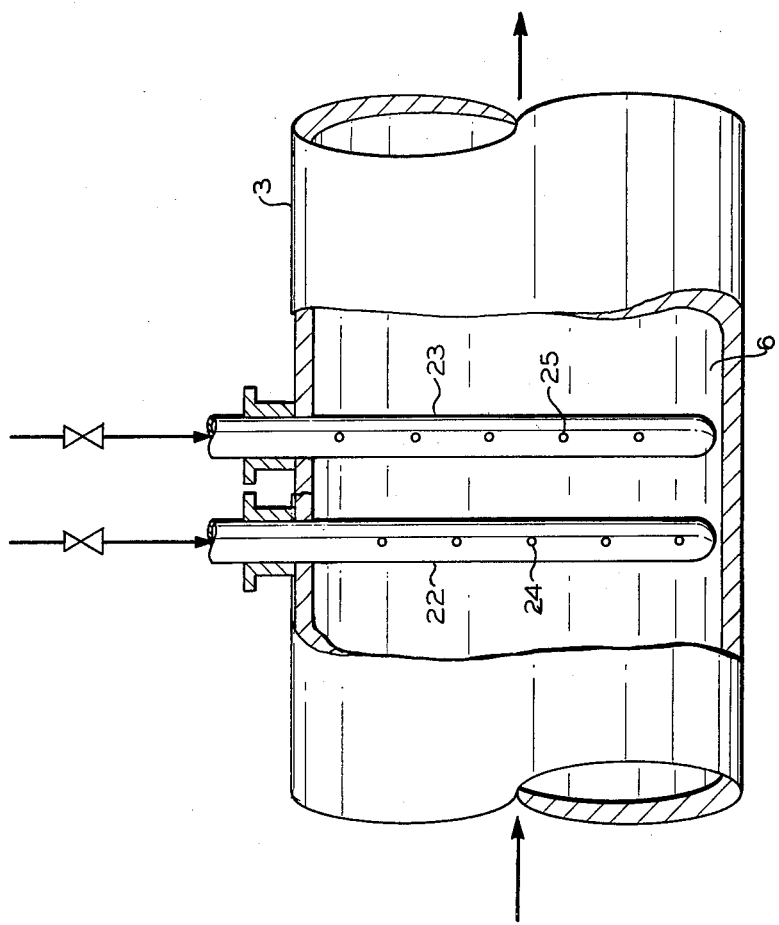
FIG. 5 is a fragmentary side-elevational view in cross section of another modified form of the present invention.

The embodiment of the invention shown in FIG. 5 is similar to the embodiment of the invention shown in FIG. 4 wherein the same numerals designate the same parts or structure. The difference between the embodiment of the invention shown in FIG. 4 and that shown in FIG. 5 is that the tubular members 22 and 23 are not only spaced apart from each other on opposite sides of the longitudinal axis of the quench compartment 6 but they are also spaced from each other apart along the longitudinal axis of the quench compartment 6 such as the tubular member spacing for the embodiment of the invention shown in FIG. 3.

The apparatus 1 also can be provided with indirect heat exchange means 28 which is in flow communication with the outlet of the reactor 2 for further cooling of the effluent. Downstream of the heat exchanger 28 there can be provided filter means 29 such as a bag filter, which is in flow communication with the heat exchanger 28 and is operable for separating the effluent into an off-gas phase and particulate carbon black. The off-gas is discharged via an outlet discharge 30 and the carbon black is discharged via an outlet 31. The separated carbon black discharged via the discharge 31 can then be introduced into a pelleter 32 of any suitable type such as those known in the art for forming the particulate carbon black into carbon black pellets. The pellets can be discharged from the pelleter via a discharge 33 to a pellet dryer 34. The dryer 34 can be of any suitable type, such as those known in the art, as disclosed in U.S. Pat. No. 3,168,383 which disclosure is incorporated herein by reference.

The following calculated example is provided to illustrate operability of the present invention:

EXAMPLE
(Estimated)

| Reaction Vessel: | Both Runs |
|---|---|
| Combustion Compartment (4): | |
| Internal Diameter, inches, | 39 (99.06 cm.) |
| Internal Length, inches, | 12 (30.48 cm.) |
| Reaction and Quench Compartment (5 & 6): | |
| Internal Combined Length, inches, (Measured from downstream wall of combustion compartment 4) | 112 (284.48 cm.) |
| Internal Diameter, inches, | 15 (38.10 cm.) |
| (a) Length to Prequench, inches, | 48 (121.92 cm.) |
| (b) Length to Primary Quench, inches, | 112 (284.48 cm.) |

(a) Prequench loci can be selected at, e.g., 36 inches (91.44 cm.) from the reactor conduit inlet, or at 42 inches (106.68 cm.), or at 48 inches (121.92 cm.), in a typical operation. This example uses the prequench at the 48 inch (121.92 cm.) locus in both runs. The invention uses a second prequench at 54 inches (137.16 cm.).
(b) Reactor length is defined as the distance from the combustion chamber outlet to the locus of the primary quench, which is 112 inches (284.48 cm.) in the example.

| Operation: | Both Runs |
|---|---|
| Make Oil: | |
| BMCI Value, | 120 |
| Mid-Boiling Point, | 700° F. (371.1° C.) |
| Gallons per Hour, | 325 (1230.13 liters/hr.) |
| Tangential Air: | |
| SCF/hr., | 210,000 (5950.69 m³/hr.) |
| Tangential Fuel Gas: | |
| Btu/SCF, | 1000 |
| SCF/hr., | 13,680 (387.65 m³/hr.) |
| Axial Air: | |
| SCF/hr., | 4,000 (113.35 m³/hr.) |

| | (I) | (II) |
|---|---|---|
| Prequench Water: | Single Prequench Pipe | Invention |
| Temperature, °F. | 100 (37.8° C.) | 100 (37.8° C.) |
| Total, gallon/hr., | 175 (662.4 l/hr.) | 175 (662.4 l/hr.) |
| To first pipe, gph., | (uses only | 87.5 (331.2 l/hr.) |
| To second pipe, gph., | one pipe) | 87.5 (331.2 l/hr.) |

(The prequench water quenches the reactor smoke to about 2000° F. or less (1093.3° C.), so that no further carbon black formation occurs.)

| | (I) | (II) |
|---|---|---|
| Primary Quench Water: | | |
| Temperature, °F., | 100 (37.8° C.) | 100 (37.8° C.) |
| Gallons per hour, | 450 (1703 l/hr.) | 450 (1703 l/hr.) |
| Prequench | (I) | (II) |
| Single Prequench I: | | |
| External diameter of tubular member, inch, | 11/16 (1.746 cm.) | — |
| Internal diameter of tubular member, inch, | 7/16 (1.111 cm.) | — |
| Diameter of orifices, inch, | 1/16 (0.159 cm.) | — |
| First set of orifices (180° apart, one pointing up, one pointing down) from inside of reactor wall adjacent water inlet end, inches, | 4½ (11.43 cm.) | — |
| Second set, from first, inches, | 1¾ (4.45 cm.) | — |
| Third set, from second, inches, | 1½ (3.81 cm.) | — |
| Fourth set, from third, inches, | 1¼ (3.18 cm.) | — |
| Fifth set, from fourth, inch, | 1 (2.54 cm.) | — |
| Sixth set, from fifth, inch, | ½ (1.27 cm.) | — |
| Prequench locus (a), inches, | 48 (121.92 cm.) | — |
| Two Prequench System (Invention) II: | | |
| First Prequench Conduit: | | |
| External diameter of tubular member, inch, | — | 11/16 (1.746 cm.) |
| Internal diameter of tubular member, inch, | — | 7/16 (1.11 cm.) |
| Diameter of orifices, inch, | — | 1/22 (0.115 cm.) |
| First Prequench locus (a), inches, | — | 48 (121.92 cm.) |
| First set of orifices (180° apart, one pointing up, one pointing down) from inside of reactor wall adjacent water inlet end, inches, | — | 4½ (11.43 cm.) |
| Second set, from first, inches, | — | 1¾ (4.45 cm.) |
| Third set, from second, inches, | — | 1½ (3.81 cm.) |
| Fourth set, from third, inches, | — | 1¼ (3.18 cm.) |
| Fifth set, from fourth, inch, | — | 1 (2.54 cm.) |
| Sixth set, from fifth, inch, | — | ½ (1.27 cm.) |
| Second Prequench Conduit: | | |
| External diameter of tubular member, inch, | — | 11/16 (1.746 cm.) |
| Internal diameter of tubular member, inch, | — | 7/16 (1.111 cm.) |
| Diameter of orifices, inch, | — | 1/22 (0.115 cm.) |
| Second Prequench Locus (a), inches | — | 54 (137.16 cm.) |
| First set of orifices (180° apart, one pointing up, one pointing down) from inside of reactor wall adjacent water inlet end, inches, | — | 3⅝ (9.20 cm.) |
| Second set, from first, inches | — | 1¾ (4.45 cm.) |
| Third set, from second, inches | — | 1⅝ (4.13 cm.) |
| Fourth, from third, inches | — | 1⅜ (3.49 cm.) |
| Fifth, from fourth, inches | — | 1⅛ (2.86 cm.) |
| Sixth, from fifth, inch | — | ¾ (1.91 cm.) |
| Seventh, from sixth, inch | — | ½ (1.27 cm.) |

It is to be understood that while there has been illustrated and described certain forms of this invention, the invention is not to be limited to the specific form or arrangement of parts herein described and shown except to the extent that such limitations are found in the claims.

What is claimed and desired to be secured by Letters Patent is:

1. An apparatus for producing carbon black, said apparatus including:
   a housing defining a chamber which includes a combustion compartment, a reaction compartment downstream of the combustion compartment, and a quench compartment downstream of the reaction compartment;
   first inlet means communicating with said combustion compartment and being operable for introducing combustion gases into said combustion compartment;

second inlet means communicating with said combustion compartment and being operable for introducing a make hydrocarbon into said combustion compartment for pyrolysis by contact with hot combustion gases to produce combustion products containing carbon black;

a plurality of tubular members extending into said quench compartment in spaced apart relationship to one another, each said tubular member having a plurality of discharge openings spaced apart along the length thereof and directed to introduce quench liquid in a plurality of sprays into said quench compartment, discharge openings of one tubular member being offset along the length of the one tubular member relative to corresponding discharge openings along the length of another of the tubular members such that open spaces in the spray pattern of quench liquid from the discharge openings of one tubular member are substantially covered by sprays from the discharge openings of the other tubular member.

2. An apparatus as set forth in claim 1 wherein:

each of said tubular members has a plurality of discharge openings some of which point in a generally opposite direction from the remainder, with all of said discharge openings being pointed generally transversely of the quench compartment.

3. An apparatus as set forth in claim 2 wherein:

said tubular members are in generally parallel relationship to one another and are spaced apart from one another along the length of the quench compartment.

4. An apparatus as set forth in claim 3 wherein:

each of said tubular members extends at least substantially across the quench compartment.

5. An apparatus as set forth in claim 4 wherein:

each of said tubular members extends generally transversely through the longitudinal axis of the quench compartment.

6. An apparatus as set forth in claim 2 wherein:

said tubular members are in generally parallel relationship to one another and are spaced apart from one another in a plane extending generally transversely of the quench compartment.

7. An apparatus as set forth in claim 6 wherein:

each of said tubular members extends at least substantially across the quench compartment.

8. An apparatus as set forth in claim 2 wherein:

said tubular members are in generally parallel relationship to one another and at least one tubular member is positioned on an opposite side of the longitudinal axis of the quench compartment from at least one other of the tubular members, the tubular member on one side of the longitudinal axis being spaced along the length of the quench compartment from the at least one other of the tubular members.

9. An apparatus as set forth in claim 8 wherein:

each of said tubular members extends at least substantially across the quench compartment.

10. A method of producing carbon black, said method including:

contacting feedstock hydrocarbon with hot combustion gases in a reaction zone for pyrolyzing said feedstock hydrocarbon and thereby producing combustion products containing carbon black particles;

flowing the thus produced combustion products through a quench zone and contacting substantially all of the combustion products with a plurality of sprays of quench liquid, said sprays of quench liquid being introduced into the quench zone from more than one plurality of series of spray openings, each series of said more than one plurality of series of spray openings having a plurality of spaced-apart spray openings forming a respective series of sprays in a generally linear array extending into said quench compartment and forming the respective series of sprays into a spray pattern with open areas the spray openings of one linear array of one plurality of series of spray openings being offset along the length of the linear array relative to corresponding openings along the length of another linear array of another plurality of series of spray openings such that open areas of a spray pattern of one linear array of one plurality of series of spray openings are substantially covered by sprays of another linear array of another plurality of series of spray openings.

11. A method as set forth in claim 10 wherein:

each of said plurality of series of spray openings forms a spray pattern having a plurality of sprays with the sprays of one spray pattern pointing in a direction generally opposite to the sprays of another spray pattern from a respective tubular member, said sprays being pointed generally transversely of the quench zone.

12. A method as set forth in claim 11 wherein:

said plurality of series of spray openings are in generally parallel relationship to one another and are spaced apart along the length of the quench zone.

13. A method as set forth in claim 12 wherein:

each of said plurality of series of spray openings extends at least substantially across the quench zone.

14. A method as set forth in claim 13 wherein:

each of said plurality of series of spray openings extends generally transversely through the longitudinal axis of the quench zone.

15. A method as set forth in claim 11 wherein:

said plurality of series of spray openings are in generally parallel relationship to one another and are spaced apart from one another in a plane extending generally transversely of the quench zone.

16. A method as set forth in claim 15 wherein:

each of said plurality of series of spray openings extends at least substantially across the quench zone.

17. A method as set forth in claim 11 wherein:

said plurality of series of spray openings are in generally parallel relationship to one another and at least one of said plurality of series of spray openings is positioned on an opposite side of the longitudinal axis of the quench zone from at least one other of the plurality of series of spray openings, the series of spray openings on one side of the longitudinal axis being spaced apart along the length of the quench zone from the at least one other of the series of spray openings.

18. A method as set forth in claim 17 wherein:

each of said plurality of series of spray openings extends at least substantially across the quench zone.

* * * * *